United States Patent [19]
Luciani et al.

[11] Patent Number: 6,096,681
[45] Date of Patent: Aug. 1, 2000

[54] CARRIER FOR OLEFIN POLYMERIZATION CATALYSTS

[75] Inventors: Luciano Luciani, Ferrara, Italy; Wolfgang Neissl, Lichtenberg; Norbert Hafner, Linz, both of Austria

[73] Assignee: Borealis GmbH, Austria

[21] Appl. No.: 09/023,772

[22] Filed: Feb. 13, 1998

[30] Foreign Application Priority Data

Feb. 17, 1997 [EP] European Pat. Off. ............. 97102500

[51] Int. Cl.⁷ ..................................... B01J 21/10
[52] U.S. Cl. ............................................ 502/251; 502/237
[58] Field of Search ................................. 502/251, 237, 502/239, 242, 246, 247, 248

[56] References Cited

U.S. PATENT DOCUMENTS

| | | | |
|---|---|---|---|
| 4,639,430 | 1/1987 | Pasquet et al. | 502/120 |
| 5,006,620 | 4/1991 | Zolk et al. | 526/128 |
| 5,173,465 | 12/1992 | Luciani et al. | 502/119 |
| 5,310,716 | 5/1994 | Luciani et al. | 502/107 |

FOREIGN PATENT DOCUMENTS

| | | |
|---|---|---|
| 207834 | 1/1987 | European Pat. Off. . |
| 0 776 912 | 6/1997 | European Pat. Off. . |

*Primary Examiner*—Steven P. Griffin
*Assistant Examiner*—Stuart L. Hendrickson
*Attorney, Agent, or Firm*—Wenderoth, Lind & Ponack, L.L.P.

[57] ABSTRACT

Procedure for the preparation of a solid carrier for olefin polymerization catalysts, comprising the steps:

a) impregnating a silica with a solution of Mg-chloride in the presence of electron donors, b) drying the impregnated silica obtained in (a) and impregnating it with a solution of Mg-alkyls in $SiCl_4$ at a temperature from −10 to 20° C., optionally adding a further amount of electron donors, c) subsequently treating the slurry obtained in (b) at a temperature from 40° C. to reflux temperature, d) drying the carrier obtained in (c).

14 Claims, No Drawings

CARRIER FOR OLEFIN POLYMERIZATION CATALYSTS

The present invention relates to a procedure for producing a carrier (or support) to be used for the preparation of catalysts for polymerizing α-olefins alone or in mixture.

α-olefins such as ethylene, propylene and higher olefin monomers can be polymerized by using Ziegler-Natta-catalysts based on a combination of organometallic compounds of elements of groups IA to IIIA and a compound of a transition metal belonging to groups IVB to VIB of the periodic table (e.g. in Boor Jr, Ziegler-Natta-Catalysts and Polymerization, Academic Press, New York, 1979).

To improve the morphology of the resin, it is moreover known to impregnate a granular solid of microspheroidal carrier with the catalyst (Karol F. J., Cat. Rev. Sci. Eng. 26, 384, 557–595, 1984). Among others, silica can be used as a catalyst carrier for α-olefin polymerization.

It is important to use an appropriate selective carrier for the preparation of α-olefin catalyst preparation, which can be impregnated with the active part of the catalysts, thereby enhancing the properties.

Various proposals have been made in the art for preparing a carrier and subsequently a catalyst for olefin polymerization. From EP-A-776,912, a catalyst for the polymerization of olefins is known, which is prepared by impregnating a silica with a Mg-halide and a Mg-alkyl, halogenating and then impregnating with a Ti-tetrahalide.

According to U.S. Pat. No. 5,310,716, a non preactivated silica (containing hydroxyl groups and water) is treated with Mg-alkyl and then (after removing the liquid, washing and drying) with tetrachlorosilane, whereby a carrier is obtained. After this step, a treatment with an excess of Ti-tetrachloride and donor is carried out.

According to U.S. Pat. No. 5,006,620 a silica is treated with Mg-alkyl, then with chlorine or hydrochloric acid and with a $C_{1-8}$-alkanol for attaining a carrier, which is subsequently treated with an excess of Ti-tetrachloride and donor for achieving a catalyst.

According to U.S. Pat. No. 4,639,430, a silica is impregnated with Mg-chloride (dissolved in water), dried, mixed with $NH_4Cl$ and treated at high temperature, whereby a carrier with a minimum content of hydroxyl groups is obtained. This support is then impregnated with heptane, containing a very small amount of Ti-tetrachloride for attaining a catalyst for the preparation of polyethylene or for ethylene-propylene rubbers.

In the field of catalyst research it is still strongly desirable to find new catalyst components or catalyst systems with improved performance, especially with high activity and/or high stereoregularity.

According to the present invention, it has now been found that a silica, which does not contain free water, but different amounts of hydroxylgroups, can be treated with a solution of Mg-chloride in the presence of electron donors and with a solution of Mg-alkyls dissolved in Si-tetrachloride at low temperature and subsequently heating to reflux temperature, whereby Mg-chloride is precipitated.

The present invention accordingly provides a procedure for the preparation of a solid carrier for olefin polymerization catalysts, comprising the steps:

a) impregnating a silica with a solution of Mg-chloride in the presence of electron donors, b) drying the impregnated silica obtained in (a) and impregnating it with a solution of Mg-alkyls in $SiCl_4$ at a temperature from −10 to 20° C., optionally adding a further amount of electron donors, c) subsequently treating the slurry obtained in (b) at a temperature from 40° C. to reflux temperature, d) drying the carrier obtained in (c).

We have moreover found that by treating this carrier (or support) with Ti-tetrachloride or a mixture of Ti-tetrachloride and Ti-alkoxide, highly active catalysts for stereoregular polypropylenes and for polyethylene, including their copolymers, are obtained.

The silica suitable for the support is preferably a spheroidal, porous silica with a particle size of 15 to 150 micron, with a surface area of 100 to 500 $m^2/g$, a pore volume of 1,2 to 3 ml/g and an average pore diameter of 20 to 500 angstrom. The silica has preferably a content of hydroxyl groups of 0 to 5 mmol/g, most preferred of 0,1 to 3 mmol/g.

The preferred solvent for Mg-chloride is an ester like e.g. ethyl formiate, ethyl acetate, ethyl propionate, isopropyl acetate, isopropyl propionate or ethyl carbonate. Preferred esters are ethyl formiate, ethyl acetate, ethyl propionate, isopropyl acetate, isopropyl propionate.

According to the invention, it is further preferred that the silica obtained after the impregnation step (a) contains less than 6% wt of Mg, referred to the final carrier, and that the carrier obtained in step (d) contains 2 to 10% wt, preferably 5 to 8% wt of Mg, referred to the final carrier.

In step (a) of the invention, the silica is directly impregnated with Mg-chloride, whereas an additional amount of Mg-chloride is brought into the silica by the reaction of Mg-alkyl and $SiCl_4$, which are added in step (b) and which react mainly at the higher temperature in step (c), whereby said additional Mg-chloride is precipitated. The weight ratio of Mg-chloride from step (a): Mg-chloride from steps (b/c) is preferably in the range of 0.1:1 to 10:1, more preferred between 0.2:1 to 5:1 and most preferred between 0.5:1 to 2:1. Further preferred is a molar ratio of Mg-alkyl: $SiCl_4$ from 1:5 to 1:30. Phthalic acid esters are preferred as donors, whereby the most preferred donor is diisobutylphthalate (DIBP). The donors are preferably used in an amount of 20 to 100% wt, referred to the silica, but it is also possible to use higher amounts of donors.

The Mg-alkyls used in step (b) are preferably Mg-alkyls with 1 to 10 C-atoms in the alkyl group. Most preferred are Mg-diethyl, Mg-ethylbutyl, Mg-dihexyl and Mg-butyloctyl.

According to the present invention, the procedure will preferably comprise the following steps:

In the first step of the invention, the silica is suspended in a solution of Mg-chloride in ethylacetate (EA) in the presence of DIBP, the amount of DIBP being 20 to 100% wt, preferably 60% wt, referred to the silica. The impregnation of the silica with Mg-chloride dissolved in EA can be carried out in one or more steps. Ethylformiate, ethylpropionate, isopropylacetate or isopropylpropionate can also be used as a solvent. The amount of Mg to be impregnated in the form of Mg-chloride is 1 to 6% wt, preferably 4% wt, referred to the final carrier.

The above slurry is then heated for 2 h at reflux under stirring, and then EA is distilled off. The dried carrier is subsequently submitted to another impregnation step, using a solution of Mg-alkyl in Si-tetrachloride. As Mg-alkyl, Mg-diethyl, Mg-ethylbutyl, Mg-butyloctyl or Mg-dihexyl may be used. The amount of Mg to be impregnated in this step in the form of e.g. Mg-dihexyl, which is then converted to Mg-chloride at higher temperatures, is 1 to 9% wt, preferably 1 to 4% wt, referred to the final carrier. After 2 h stirring at about 0° C., the temperature is increased to reflux and maintained for 2 h at this value, whereby Mg-chloride is precipitated in disordered active form into the pores of the silica. At this step the diluent is removed and after drying the carrier is ready to be used for catalyst preparation.

The invention further concerns a procedure for the preparation of a supported catalyst for the polymerization of α-olefins, wherein a carrier (or support) obtained according to the invention, is contacted with a transition metal halide of group IVb, Vb or VIb of the periodic table, and optionally with electron donors. Preferably Ti-tetrachloride is used as the transition metal halide, optionally in the presence of a Ti-alkoxyde. The Ti-tetrachloride may be used undiluted or as a solution in organic solvents, e.g. in toluene or ethylbenzene.

The supported catalyst as described above can be advantageously used in bulk, slurry or gas phase processes for the preparation of polyolefins by homopolymerization or copolymerization with two or more monomers. The catalyst can be used also in the polymerization of ethylene as it is or omitting internal and external donors.

The present invention further relates to a process for the preparation of polyolefins by homopolymerization or copolymerization of olefins, wherein a supported catalyst as described above is used. The polymerization is conducted according to conventional methods, operating in a liquid phase, either in the presence or in the absence of an inert hydrocarbon diluent, or in gas phase.

The catalyst of the invention can be used also at higher temperatures, whereby the polymerization is preferably carried out at a temperature of about 20° to 150° C., more preferred between 70° C. and 120° C., at atmospheric pressure or at a higher pressure, in absence or in presence of hydrogen.

The catalyst of the present invention shows an improved performance, and is also permitting to achieve very low values of extractable amorphous resins in boiling n-heptane and xylene.

Many other α-olefins can also be polymerized using this catalyst, like butene-1, 4-methyl-1-pentene, hexene-1, alone or in mixture with other α-olefins for obtaining copolymers and terpolymers, mainly of rubber type.

The use of this catalyst permits moreover to obtain controlled polymer particle size of the desired dimension on the basis of the choice of the selected silica.

EXAMPLE 1

Carrier preparation:

20 g microspheroidal silica, treated at 740° C. (resulting in 1,12 mmol/g of OH-groups), with a surface area of 150–300 m$^2$/g, pore volume of 1,58 m/g and an average particle sice of 75 micron, are charged in nitrogen atmosphere into a 500 ml flask, equipped with a reflux cooler, stirrer and thermometer, containing a solution of 4,5 Mg-chloride dissolved in 300 ml ethylacetate and 10 ml diisobutylphthalate. The slurry is treated at reflux for 2 h under stirring and then distilled at 90° C. without vacuum. Then the resulting white powder is dried under vacuum at 90° C. for 1 h. This powder is added under nitrogen to a solution of 20 g Mg-(hexyl)2 (diluted in a hydrocarbon: 20% wt in heptane) in 100 ml Si-tetrachloride at 2° C. and stirred for 2 h. Then the temperature is increased to the reflux, and the slurry is stirred for 2 h to precipitate Mg-chloride in disordered active form. After adding 10 ml diisobutylphthalate and 20 ml n-heptane, stirring was continued for 1 h at reflux. After washing with 300 ml n-heptane for two times and with 300 ml n-pentane for two times (all washings at room temperature) and drying, the carrier is ready to be used to prepare a catalyst usable for polymerization or copolymerization of ethylene, propylene and other alpha-olefines.

Catalyst preparation:

The carrier, obtained as described, is treated at 110° C. with 120 ml Ti-tetrachloride for 1,5 h. After filtering at 110° C., the treatment with Ti-tetrachloride at 110° C. is carried out again twice. After final-filtration at 110° C., the solid material is washed 5 times with 300 ml of n-heptane at 95° C. for 0,5 h each time. After two washing treatments with 300 ml n-pentane at room temperature, the catalyst is dried. 53,08 g of a brown powder were obtained, containing 4,05% wt Ti, 5,49% wt Mg and 31,8% wt Cl.

Polymerization:

The activity and stereospecifity of this solid catalyst component were determined in runs of propylene polymerization in liquid monomer, using aluminiumtrialkyls treated with electron-donor compounds as a cocatalyst:

A 5 l-autoclave equipped with a magnetic stirrer was filled with 1327 g propylene and 10 l H$_2$, which was used as a molecular weight modifier. About 24 mg of solid catalyst component were mixed with a complex of triethylaluminium/dicyclopentyldimethoxysilane (20:1 mol/mol) in a ratio of 100:1 (mol Al/mol Ti) and introduced into the autoclave. After heating to 70° C., the polymerization was running for two hours and then the remaining propylene was flashed off. The polymer was stabilized and dried at 50° C. under vacuum. A yield equal to 12,9 kg PP per g of solid catalyst component and equal to 319 kg PP per g of Ti was achieved with the following characteristics:

MFI (2,16 kg; 230° C. ASTM D 1238 L)=7,4

Bulk density (g/ml)=0,423

Isotactic index (%)=98,0

Xylene cold solubles (% wt)=0,98

What is claimed is:

1. Procedure for the preparation of a solid carrier for olefin polymerization catalysts, comprising the steps:
    (a) impregnating a silica with a solution of Mg-chloride in the presence of electron donors,
    (b) drying the impregnated silica obtained in (a) and impregnating it with a solution of Mg-alkyls in SiCl$_4$ at a temperature from −10 to 20° C., optionally adding a further amount of electron donors, to form a slurry,
    (c) subsequently treating the slurry obtained in (b) at a temperature from 40° C. to reflux temperature, to form a treated carrier slurry,
    (d) drying the treated carrier slurry obtained in (c) to form said solid carrier.

2. Procedure according to claim 1, wherein an ester is used as a solvent for Mg-chloride.

3. Procedure according to claim 2, wherein the solvent for Mg-chloride is ethyl formiate, ethyl acetate, ethyl propionate, isopropyl acetate or isopropyl propionate.

4. Procedure according to claim 1, wherein less than 6% wt. of the Mg present in the carrier of step (d) is added in step (a).

5. Procedure according to claim 1, wherein the solid carrier obtained in step (d) contains 2 to 10% wt. of Mg.

6. Procedure according to claim 1, wherein the silica has a content of OH-groups of 0 to 5 mM/g.

7. Procedure according to claim 1, wherein the silica is spheroidal and porous without a content of free water, and having an average particle size of 15 to 150 micron, a surface area of 100 to 500 m$^2$/g, a pore volume of 1.2 to 3 ml/g and an average pore diameter of 20 to 500 angstrom.

8. Procedure according to claim 1, wherein the molar ratio of Mg-alkyl: SiCl$_4$ is from 1:5 to 1:30.

9. Procedure according to claim 1, wherein phthalic acid esters are used as donors.

10. Procedure according to claim 9, wherein diisobutylphthalate is used as the donor.

11. Procedure according to claim 1, wherein the donor is used in an amount of 20 to 100% wt, referred to the silica.

12. Procedure according to claim 1, wherein the Mg-alkyl is a Mg-diethyl, Mg-ethylbutyl, Mg-dihexyl or Mg-butyloctyl.

13. Procedure for the preparation of a supported catalyst for the polymerization of α-olefins, wherein a carrier (or support) obtained according to claim 1, is contacted with a transition metal halide of group IVb, Vb or VIb of the periodic table, and optionally with electron donors.

14. Procedure according to claim 1, wherein the solid carrier obtained in step (d) contains 5 to 8% wt. of Mg.

* * * * *